(No Model.)
J. W. SEE.
METHOD OF AND APPLIANCE FOR MAKING GEARS.
No. 600,994. Patented Mar. 22, 1898.
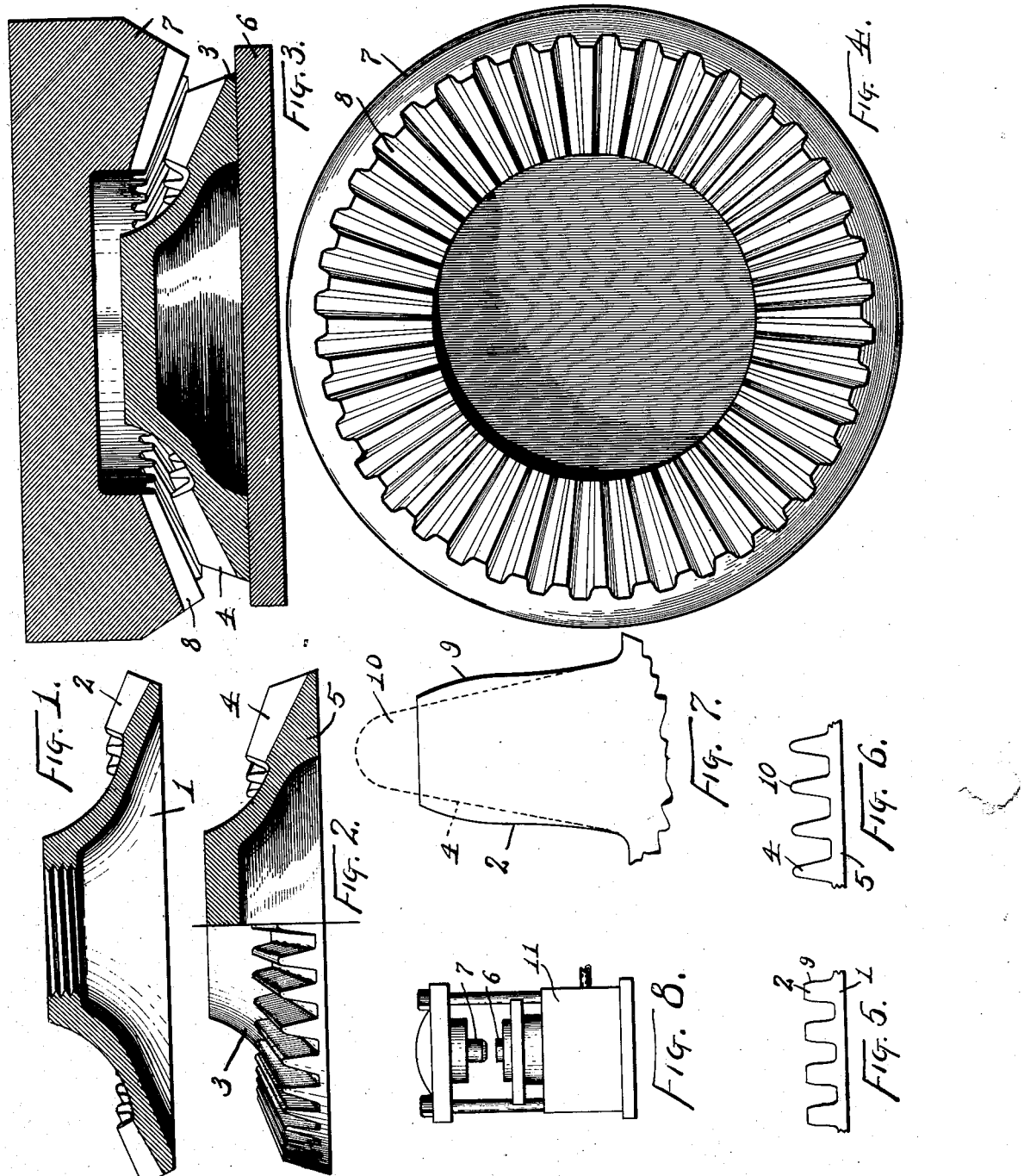
Witnesses:
E. R. Shipley.
M. S. Belden.
James W. See   Inventor

UNITED STATES PATENT OFFICE.

JAMES W. SEE, OF HAMILTON, OHIO.

METHOD OF AND APPLIANCE FOR MAKING GEARS.

SPECIFICATION forming part of Letters Patent No. 600,994, dated March 22, 1898.

Application filed September 7, 1897. Serial No. 650,716. (No model.)

*To all whom it may concern:*

Be it known that I, JAMES W. SEE, of Hamilton, Butler county, Ohio, have invented certain new and useful Improvements in Methods of and Appliances for Making Gears, of which the following is a specification.

This invention pertains to improvements in toothed gearing and in the method of and appliances for making the same, and the invention will be readily understood from the following description, taken in connection with the accompanying drawings, in which—

Figure 1 is a diametrical section of a typical bevel-gear to be produced; Fig. 2, a side elevation, half diametrical section, of the same gear partially finished; Fig. 3, a diametrical section of the partially-finished gear in conjunction with exemplifying upsetting-dies; Fig. 4, a face view of one of the exemplifying upsetting-dies; Fig. 5, an end elevation of a few of the teeth of the finished product; Fig. 6, an end elevation of a few of the teeth of the partially-finished product; Fig. 7, an end elevation, on an enlarged scale, of one of the finished teeth, the dotted line giving the contour of the partially-finished tooth; and Fig. 8, a front elevation of a typical machine for operating the dies.

It has been an accepted maxim that accurate toothed gearing could only be produced by cutting processes. In cutting spur-gears one cut may finish a tooth-space, and the cutting cost will obviously be directly as the number of teeth in the gear. Bevel-gearing making any pretension to accuracy cannot be produced with a single cut for each tooth-space, even crudely-cut work calling for two cuts for each tooth-space. Regardless of expense, correct bevel-gears cannot have their teeth cut with rotary cutters. In correctly-formed bevel-gears all of the lines lying along the teeth converge to a focus, and this result cannot be produced by circular-toothed contour cutters. It has therefore become customary in using circular cutters for cutting bevel-gears to accept distorted teeth. The focal planing-machine, planing the sides of the teeth with a sharp tool-corner moving in focal lines, is capable of producing theoretically perfect work; but in practice the delicate tool-corner wears away and accuracy becomes defeated. Spiral cutters making motions of reciprocation and partial rotation would produce theoretically correct bevel-gearing; but the work is slow and expensive. In any of the cutting operations the cost increases with the number of teeth. Where accurate bevel-gears are required in large quantities, the question of cost of tooth-cutting becomes a serious one, and the cost and maintenance of plant is equally serious.

By my improved method it is believed that bevel-gearing can be produced in quantities at a trifling cost compared with that of any tooth-cutting process and with a degree of accuracy not attainable in a system of extended manufacture by the tooth-cutting process. The gears produced by my improved method must be of metal possessing some degree of malleability, say wrought-iron or steel. I form a tooth-gear by die or drop forging process with teeth abnormally thin and high. I then upset the teeth to proper thickness within a die confining the tooth sidewise and controlling its contour.

Referring to the drawings, 1 indicates a typical bevel-gear—such, for instance, as is adapted for use on bicycles, such gears being required in great numbers and of exceptional accuracy; 2, the finished teeth thereof having the usual approved cross-sectional contour; 3, the partially-finished gear, the same being a drop-forging of but ordinary accuracy of production; 4, the teeth of the partially-finished gear, the same being abnormally thin and high; 5, material in the partially-finished gear under the teeth 4; 6, an anvil-die on which the partially-finished gear is laid; 7, an upsetting-die adapted to operate upon the teeth of the partially-finished gear; 8, the tooth-spaces of the upsetting-die, the same conforming in cross-sectional contour with the teeth 2 of the finished product, the tooth-spaces in the upsetting-die having greater lengthwise extent than the teeth in the partially-finished gear; 9, Fig. 7, the flanks of the teeth of the finished product; 10, the crown of the teeth of the partially-finished gear, the same representing the abnormal height of these teeth as compared with the teeth of the finished product; and 11, a typifying-machine in the form of a hydrostatic press for pressing the dies together.

In making the gears a gear is first produced by drop-forging or equivalent process with teeth of abnormal thinness and height, only good ordinary accuracy and smoothness being sought for at this stage of the process. The partially-finished gear is then accurately faced on its back under the metal 5, so as to lie fairly on the anvil-die 6. The partially-finished gear is then to be pickled and cleaned, so as to be as free as possible from scale, and, if found needful, it is to be annealed. In facing the back of a gear it is to be chucked true with the roots of the teeth or the floors of the tooth-spaces. The partially-finished gear is now to be subjected to powerful pressure between the anvil-die and the upsetting-die, the upsetting-die squeezing down the crowns 10 of the teeth and expanding them in thickness to fill the tooth-spaces of the upsetting-die. The gear is then to be chucked true and the necessary lathework done upon it to remove extra metal 5 and the surplus metal at the ends of the teeth and to bring the web to the proper thickness.

The upsetting-die is to be formed with extreme accuracy. Assume that by the best-known methods of cutting bevel-gearing it is proposed to produce a single gear of great accuracy. Such a gear would be expensive; but the expense would be multiplied if great numbers of such gears were wanted. The upsetting-die 7 is to be made with the same care and accuracy as in the case of the assumed single bevel-gear; but when this die is done the production of a large number of accurate gears by means of the die does not call for a multiplication of the expense. By the most accurate system of tooth-cutting the wear of the cutting-tool will result in eccentricity of gear or in thickening of the teeth in succession along the series of teeth being cut. By proper testing and correction a sufficiently accurate result may be attained either in a cut gear or in the upsetting-die 7; but the cost of accuracy in cut gearing will be multiplied as more gearing is produced, while with the upsetting-dies the cost is not multiplied as more gears are produced. The gear-teeth produced by the upsetting-die will therefore possess the accuracy of the die, and that accuracy can be considerably in excess of anything practically attainable in the production of cut gears in quantities. The upsetting operation is to be performed while the partially-finished gear is cold, and consequently the faces of the teeth of the finished gear are formed of higher condensed metal swaged between the sides of the tooth-spaces of the upsetting-die. Should it be desirable to harden the finished gears, some distortion may result; but no superior degree of distortion and hardening is chargeable to the improved method by which the gear was produced.

I claim as my invention—

1. In means for making toothed gears, the combination, substantially as set forth, of a toothed forging-die, a toothed upsetting-die corresponding with said forging-die but having its tooth-spaces of greater width and less depth than the tooth-spaces in said forging-die, and anvil-dies to oppose and coöperate with said toothed dies.

2. In means for making toothed gears, the combination, substantially as set forth, of a toothed upsetting-die adapted to receive a partially-finished toothed gear of malleable material, the tooth-spaces of said die being of greater width and less depth than the teeth in said partially-finished gear, an anvil-die to engage upon the opposite side of said partially-finished gear, and means for forcibly approaching the two dies while the partially-finished gear is between them.

3. That improvement in the art of making toothed gears which consists, first, in forging the gear with teeth of abnormal height and thinness, second, in pickling the partially-finished gear, and, third, in upsetting the teeth to normal height and thickness.

JAMES W. SEE.

Witnesses:
SAM D. FITTON, Jr.,
M. S. BELDEN.